Jan. 3, 1967 G. J. YAGUSIC ETAL 3,296,596

SYSTEM AND APPARATUS FOR AUTOMATIC DATA COLLECTION

Filed Sept. 30, 1963 4 Sheets-Sheet 1

INVENTORS
GEORGE J. YAGUSIC
JOHN F. CARRAGAN

BY Black and Buckles
ATTORNEYS

Jan. 3, 1967 G. J. YAGUSIC ETAL 3,296,596

SYSTEM AND APPARATUS FOR AUTOMATIC DATA COLLECTION

Filed Sept. 30, 1963 4 Sheets-Sheet

SYSTEM AND APPARATUS FOR AUTOMATIC DATA COLLECTION

Filed Sept. 30, 1963 4 Sheets-Sheet 4

United States Patent Office 3,296,596

Patented Jan. 3, 1967

3,296,596

SYSTEM AND APPARATUS FOR AUTOMATIC DATA COLLECTION

George J. Yagusic, Litchfield, and John F. Carragan, Woodbury, Conn., assignors, by mesne assignments, to Control Data Corporation, Minneapolis, Minn., a corporation of Minnesota Filed Sept. 30, 1963, Ser. No. 312,699
4 Claims. (Cl. 340—172.5)

INTRODUCTION AND PRIOR ART

This invention relates to a system and apparatus for automatic data collection. More particularly, the present application is a continuation-in-part of United States patent application, Serial No. 863,227, filed December 31, 1959, by Andrew C. Reynolds, Jr., John F. Carragan and George J. Yagusic entitled "System and Apparatus for Automatic Data Collection," and of United States patent application, Serial No. 841,926, filed September 21, 1959, now Patent No. 3,109,089 by Andrew C. Reynolds, Jr., Oliver H. Chalker, Jr., John F. Carragan and Edward J. Gutowski, entitled "Data Transmission Apparatus"; which applications are incorporated herein by reference.

The data collection system disclosed in the above-identified applications comprises a plurality of data transmitting stations connected by a common communication cable to a central receiver-recorder. The present invention provides novel means whereby only one of the transmitting stations may transmit to the central receiver-recorder at a time, while the waiting time for transmission at each station during peak loading periods is equally shared; and whereby the selection of each transmitting station for transmission during peak loading periods takes place during the transmission of data from another transmitting station, thus minimizing the time between transmissions from the transmitters. The invention provides apparatus requiring a minimum number of control and location channels or wires interconnecting the transmitting stations and the central receiver-recorder of the invention.

*Related application*

It is contemplated that data collection systems according to the present invention and the above-identified applications, Serial Numbers 863,227, and 841,926, may also incorporate the inventions disclosed in the following United States patent applications:

Serial Number 98,491, filed March 27, 1961, "Shaft Rocking Mechanism," by Raymond R. Lupkas, now Patent No. 3,071,090.

Serial Number 163,153, filed December 29, 1961, "System and Apparatus for Automatic Data Collection," by George J. Yagusic, now Patent No. 3,249,917.

Serial Number 196,672, filed May 22, 1962, "Automatic Card Reading System," by Andrew Craig Reynolds, Jr., Oliver H. Chalker, Jr. and Raymond R. Lupkas.

Serial Number 205,659, filed June 27, 1962, "System and Apparatus for Automatic Data Collection," by Oliver H. Chalker, Jr., George J. Yagusic and William E. O'Conner, now Patent No. 3,268,870.

Serial Number 229,001, filed October 8, 1962, "System and Apparatus for Automatic Data Collection," by Oliver H. Chalker, Jr., George J. Yagusic and Raymond R. Lupkas.

This application is a continuation-in-part of the above-identified applications, Serial Nos. 841,926; 863,227; 163,153; 205,659; and 229,001. The present application is assigned to the same assignee as all of the above-identified earlier applications.

*Uses of the system*

The automatic data collection system of the above-identified copending applications may be used, for example, in factories where a plurality of data transmitters may be installed in different areas, shops, or departments, for transmission of manufacturing data to a central receiver-recorder which may be located in a central accounting office. Such data may include, for example: the number of units manufactured on particular machines; the designated job orders filled by machine operators; the identity and hourly wage rates of the machine operators; the total time required for each operation, etc. Alternatively, the apparatus of the invention may be used in warehouses and distribution centers for collection of order receipts and delivery time information for inventory control purposes, or in department stores for automatic collection of point of origin sales data, etc.

In a large factory, for example, there is, at present, a great deal of paper work required to be done in the various shops and departments, including the preparation of such handwritten reports as time tickets for payroll entries, production and inventory control records, cost accounting records, quality control inspection and scheduling reports, etc. For automatic central office computing, this mass of data now has to be individually punched into cards by manual operations, and the punched cards have to be verified by human operators before they can be fed to tabulating or computer apparatus. Various systems which have heretofore been suggested for expediting the flow of this information into a central office have included the use of closed-circuit television, which introduces the added problem of human error in reading the data from a TV screen, and the use of intercommunicating telephone circuits, which frequently results in error from misunderstanding of the verbally relayed information. In these prior art systems, the multiplicity of personnel involved results in divided responsibility, which is quite undesirable.

The principle of the data transmission and collection system of the above-identified copending applications is to capture the required information at the point of origin, select, sort, and collate it automatically and substantially instantaneously and then to transmit infallibly the desired data to a central receiver-recorder where it is permanently punched into tape or recorded on some other common language medium which can be fed directly into an automatic computer or conventional tabulating equipment without further intervention or possibility of human error.

The system and apparatus disclosed herein and in the above-identified copending applications is related to commercial embodiments of the system and apparatus disclosed in United States Patent No. 2,918,654 issued December 22, 1959 to Curtis Hillyer entitled "Automatic Information Transmission," and United States Patent No. 3,059,847 issued October 23, 1962 to Curtis Hillyer, entitled "Data Transmission Apparatus," and the United States patent application of Curtis Hillyer entitled "Data Transmission Apparatus," filed October 30, 1961, Serial Number 148,501.

*Problems of the prior art*

The data collection system disclosed in the above-identified copending application Serial No. 863,227 comprises a plurality of transmitting stations or transmitters remotely located from a central receiver-recorder. Each of the transmitting stations includes means for accepting and reading a plurality of punched cards and manually operable means for introducing variable information. The information recorded on the punched cards and set into the manually operable means is transmitted over common, i.e., parallel communications channels, to the central receiver-recorder where it is recorded on a continuous output medium such as punched paper tape. Since all of the remote transmitters are always connected to the common communications channels, means are provided for insuring that only one transmitter is allowed to transmit data at a time.

Such means disclosed in application Serial Number 863,227 comprise a two-level stepping switch at the central receiver-recorder and two groups of search conductors. The conductors of each group are each connected to the individual contacts of one level of the stepping switch. The stepping switch energizes, one at a time, pairs of the search conductors comprising one conductor from each of the search conductor groups until all such pairs of conductors have been energized. Each of the transmitting stations has a "location" relay. The energization coil of the location relay of a ready-to-transmit transmitter is connected in circuit to a pair of search conductors, individual to that transmitter.

When the transmitting station is ready to transmit, it sends a ready-to-transmit signal to the central receiving station. This signal caused the stepping switch to step until the transmitting station that is ready-to-transmit has its location relay energized. Means are provided for energizing the location relay of a ready-to-transmit transmitting station during transmission of a message from another transmitting station. Thus no "system time" is lost in connecting a ready-to-transmit transmitter for transmission.

The above described system disclosed in application Serial No. 863,227 works very well, but has one disadvantage. A plurality of search conductors are required equal in number to the square root of the total number of transmitting stations connected to the central receiver-recorder. Thus to provide for 36 transmitting stations it is necessary to provide 2 groups of 6 search conductors. When the transmitting stations are located remote distances from the central receiver-recorder, the cost of installing cable for the system including 12 search conductors become quite significant. It can amount to more than the cost of the transmitters and central receiver-recorder. And as the number of outlying transmitter stations and their distance from the central receiver-recorder is further increased, the cost of cabling may become prohibitive.

Other methods for insuring that only one of a plurality of transmitters transmits over a common communication cable to a central recorder are disclosed in the prior art. One such system is disclosed in United States Patent No. 1,927,556 issued September 19, 1933 to M. L. Nelson and entitled "Automatic Auditing and Merchandise Control System." The Nelson patent discloses a system wherein any number of transmitting stations may be controlled for transmission to a central receiver-recorder over common communications channels by means of two parallel conductors and an additional "chain circuit" conductor connecting all transmitters in series. However, this system operates as a seizure system. That is, when a transmitter is ready to transmit, it seizes the common communication cable whereby no other transmitter is allowed to transmit over the cable until the first transmitter has completed its message. Only then can another transmitter seize the common communications cable. If a plurality of transmitters are ready to transmit, the one at the beginning of the chain circuit connecting all the transmitters has first priority, the next station has second priority, etc., down the chain. Thus, in peak loading periods, the first few transmitters of the chain would be the only transmitters allowed to transmit. Other transmitters farther down the line would be unable to initiate transmissions. A further disadvantage of the system disclosed in the Nelson patent is that the period of time during which a transmitter seizes the common communications cable occurs between messages during peak loading periods rather than during messages as in the system disclosed in the above-identified copending application Serial No. 863,227.

Another system is disclosed in United States Patent No. 3,025,498 issued March 13, 1962 to Edwin O. Blodgett and entitled "Data Collecting System." In the system disclosed in the Blodgett patent, two chains circuits between all the transmitters and the central receiver recorder are provided; one proceeding outwardly from the recording station to each transmitter in turn and one proceeding in the opposite direction inwardly from the most remote transmitter to the central receiver-recorder. In the Blodgett system the conditioning of a ready transmitter for transmission takes place between transmissions rather than during transmissions in peak loading periods. Furthermore, the Blodgett system does not assure sequential transmission from each transmitting station in turn during peak loading periods, as is provided by the stepping switch method of the above-identified application, Serial No. 863,227. In the Blodgett system it is possible during such periods for the two transmitters closest to the recording station to alternately transmit messages over the common communications cable to the exclusion of all other transmitters.

*Objects*

Accordingly, it is an object of the present invention to provide a data collection system for the efficient collection of data during peak loading periods.

Another object of the invention is to provide a data collection system of the above character wherein a plurality of transmitters are connected over a common communications cable to a central receiver-recorder.

Still another object of the invention is to provide a data collection system of the above character wherein only one transmitting station is allowed to transmit over the common communications channel at a time.

A further object of the invention is to provide a data collection system of the above character using a minimum number of common control channels connecting the central receiver-recorder and the transmitters.

Another object of the invention is to provide a data collection system of the above character wherein a ready-to-transmit transmitter during peak loading periods is conditioned for transmission during transmission from another transmitter.

Still a further object of the invention is to provide a data collection system of the above character wherein the time between data transmissions is minimized.

Still another object of the invention is to provide a data collection system of the above character wherein the number of wires required in a cable connecting the plurality of transmitters to the central receiver-recorder is minimized.

A still further object of the invention is to provide a data collection system of the above character which is adapted to operate either as a priority system or as a system wherein waiting times for transmissions during peak loading periods are equally shared.

Yet another object of the invention is to provide a data collection system of the above character wherein the mechanisms required at the central receiver-recorder and at the transmitter for controlling transmissions from individual transmitters are simple, inexpensive and trouble-free in operation.

Other objects of the invention will in part be obvious and will in part appear hereinafter.

The invention accordingly comprises the means and features of operation and combinations of functions, and the relation of one or more of such operations and functions with respect with each of the others of the system; and apparatus embodying features of construction, combinations of elements and arrangements of parts which are adapted to effect such operations and functions; all as exemplified in the following detailed disclosure.

The scope of the invention will be indicated in the claims.

FIGURES

For a more complete understanding of the nature and objects of the invention, reference should be had to the following detailed description, taken in connection with the accompanying drawings, in which.

Figure 1:
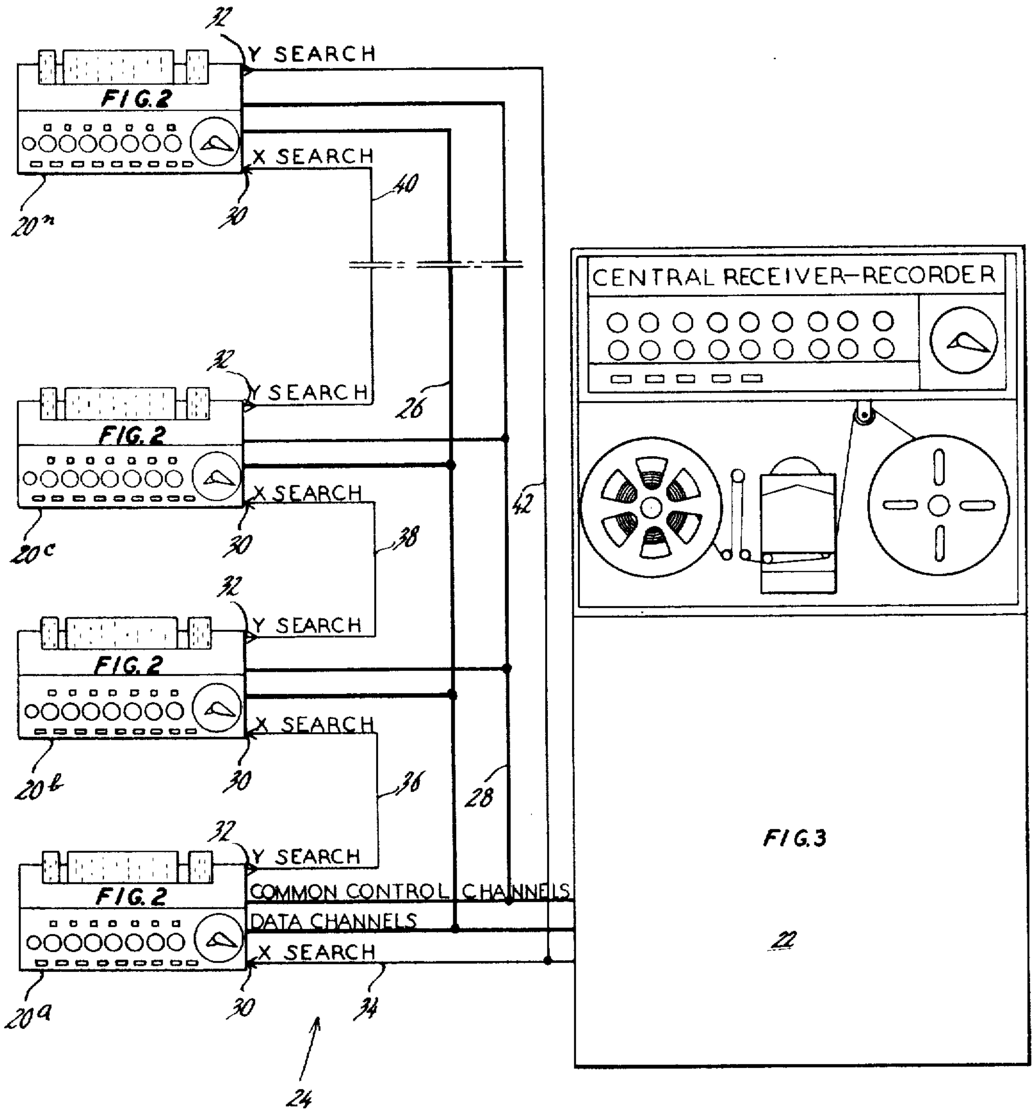
FIGURE 1 is an over-all block diagram of the preferred embodiment of a data collection system according to the present invention.
Figure 2:
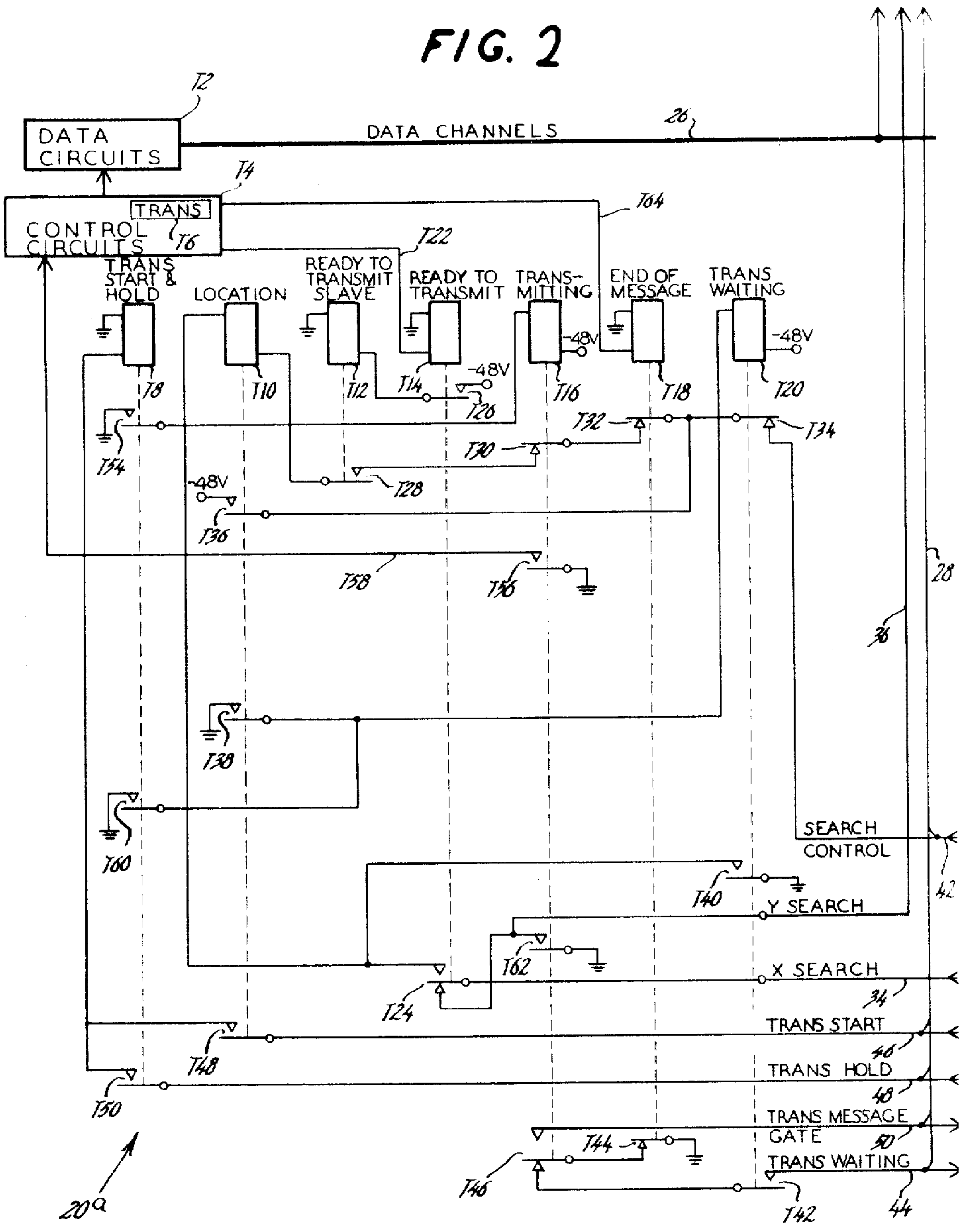
FIGURE 2 is a schematic wiring diagram partly in block form of the transmitter of FIGURE 1.
Figures 3, 3A:
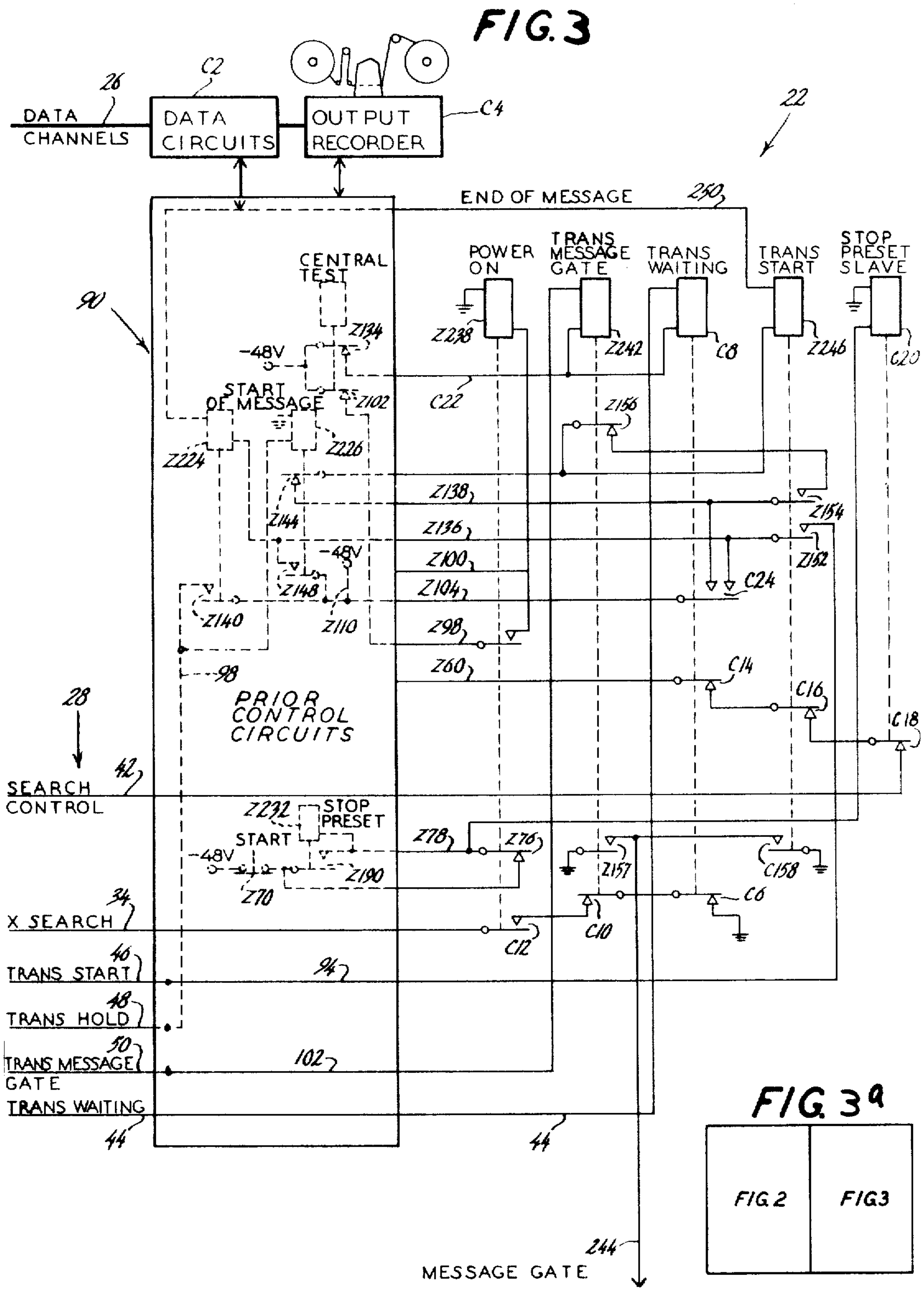
FIGURE 3 is a schematic wiring diagram partly in block form of the central receiver-recorder of FIGURE 1.
Figure 4:
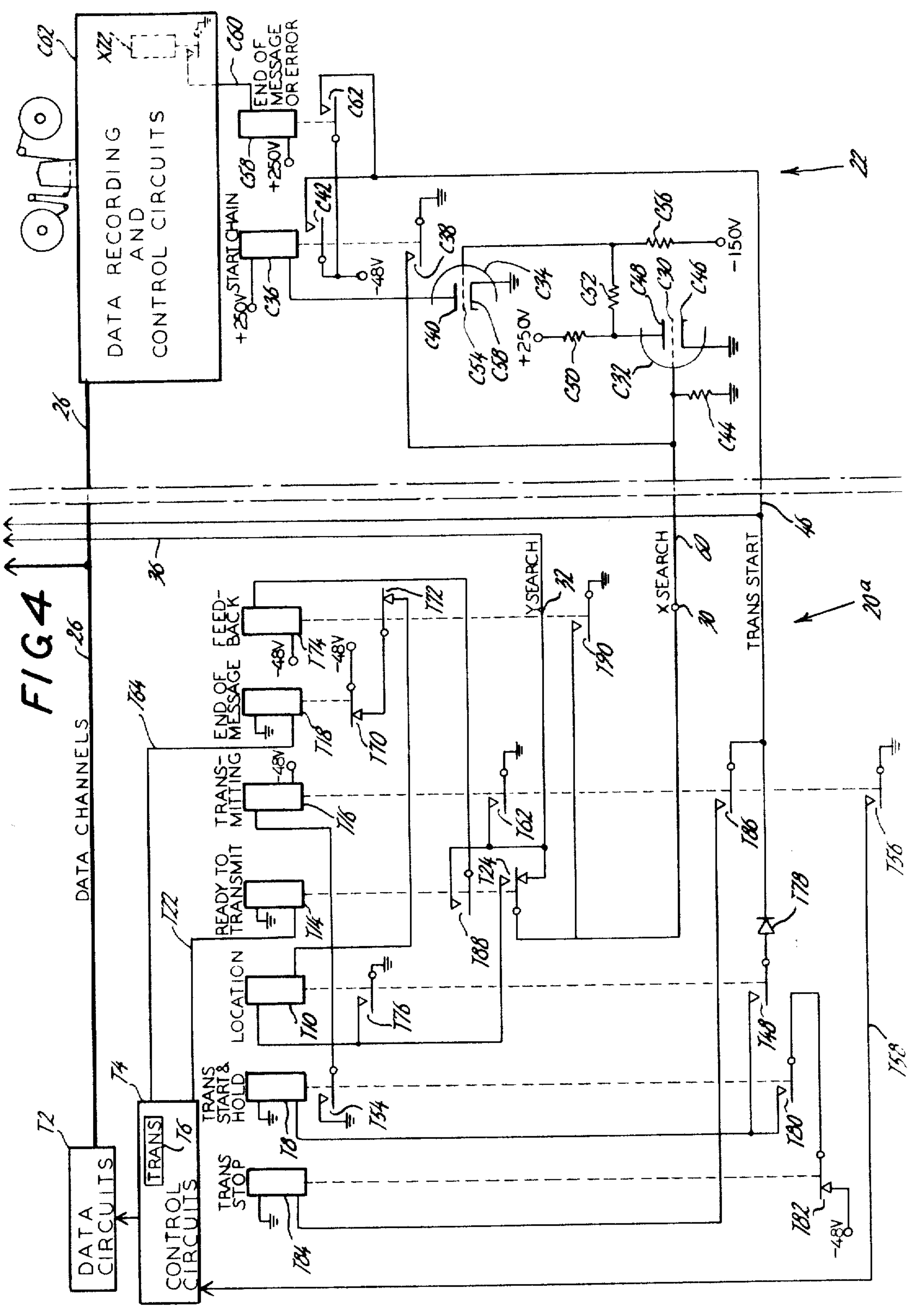

FIGURE 3*a* is a diagram showing how FIGURES 2 and 3 may be put together to form a schematic wiring diagram of the system of FIGURE 1; and, FIGURE 4 is an over-all schematic wiring diagram partly in block form of an alternative embodiment of a data collection system according to the present invention.

Reference should be had to the above-identified copending application Serial No. 863,227 for a detailed disclosure of the circuitry of the central receiver-recorders shown in FIGURES 1, 3 and 4 hereof, and particularly to FIGURES 4 and 15 thereof for a detailed disclosure of the circuitry of the central receiver-recorder control circuits illustrated in FIGURES 3 and 5 hereof.

Reference should be had to the above identified copending application Serial No. 841,926, particularly to FIGURES 28 and 29 thereof, for a detailed disclosure of the circuitry of the data transmitters shown in FIGURES 1, 2 and 4 hereof.

The same reference characters refer to the same elements in the several views of the drawings.

GENERAL DESCRIPTION

Referring to FIGURE 1, the system and apparatus of the present invention generally comprises a plurality of data transmitters **20*a* through 20*n* connected to a central receiver-recorder 22 by means of a common communications cable 24. The common communications cable 24 comprises a plurality of common data channels 26 to which each of the data transmitters 20*a*–20*n* are connected in parallel for transmission of data to the central receiver-recorder 22. Each of the data transmitters 20*a*–20*n* is also connected in parallel to a plurality of common control channels 28 connected to the central receiver-recorder 22**. This is similar to the systems disclosed in the above-identified copending applications Serial Nos. 841,926 and 863,227.

Additionally, in the present invention, each of the data transmitters **20*a* through 20*n* comprises an X search terminal 30 and a Y search terminal 32. The X search terminal 30 of the lower data transmitter 20*a* of FIGURE 1 is connected via conductor 34 to the central receiver-recorder. The Y search terminal 32 of this data transmitter is connected by conductor 36 to the X terminal of next transmitter. The Y terminal of this second transmitter of the chain is connected via conductor 38** to the X terminal of the third transmitter and so on in series through the chain of transmitters shown in FIGURE 1 to the last transmitter in the chain (the uppermost data transmitter shown in FIGURE 1).

The dotted lines in FIGURE 1 indicate that other data transmitters 20 may be connected in the chain, in the above-described manner, between the third and fourth data transmitters **20*c* and 20*n*** shown.

When none of the data transmitters **20*a*–20*n* are transmitting data to the central receiver-recorder 22, it supplies a ground on conductor 34 to the X search terminal 30 of the lowermost data transmitter 20*a* shown in FIGURE 1. Since, during such a period of inactivity, a relay in each data transmitter connects its X search terminal 30 to its Y search terminal 32, this ground will be supplied via conductors 36, 38 and 40 through each of the data transmitters 20*a*–20*n*. When any data transmitter 20*a*–20*n* is ready to transmit a message, a relay therein called the location relay energizes and disconnects its X search terminal from its Y search terminal. At the same time, a transmitter waiting signal is transmitted over the common control channels 28 to the central receiver-recorder 22. This causes the central receiver-recorder to discontinue the ground signal on conductor 34. Since a location relay can only initially be energized by means of a grounding supplied to the X search terminal of its data transmitter no location relay of any other data transmitter may now be energized. When the central receiver-recorder 22 is ready to receive a message from the waiting transmitter, it sends to it a ground signal over the common communications channels 28** to initiate a transmission therefrom. Subsequent to this "start signal," during transmission of the message, the transmitting station supplies a ground to its Y search terminal to energize the location relay of the next ready transmitting station and so on until the last transmitting station of the chain is reached.

Thus, the series connection of the X and Y search terminals of each of the transmitting stations **20*a*–20*n* insures an orderly sequence of transmission providing substantially equal waiting times for each transmitting station for transmission during peak loading periods. When the last waiting transmitting station has transmitted and no transmitter waiting signal is being sent to the central receiver-recorder 22, it again supplies a ground on conductor 34** to the first transmitting station so that the process can begin again.

The system may optionally employ a conductor 42 connecting the Y search terminal of the last transmitting station of the chain to the X search terminal of the initial transmitting station so that during such peak loading periods, no time will be lost between generation of a ground on the Y search terminal of the last transmitting station and the supply of this ground to the X search terminal of the next waiting transmitting station.

An alternative embodiment of the invention utilizing a minimum of control channels or wires is shown in FIGURE 4. In this embodiment, not only is the chain circuit previously described utilized for supplying a ground signal to ready transmitters down the chain to insure sequential transmissions therefrom, but from the time a transmitter's location relay has energized until it has completed its transmission, a ground signal is supplied to its X search terminal 30. Means are provided in each transmitter **20*a* through 20*n* for supplying a ground to its X search terminal whenever its Y search terminal is grounded. Further means are provided at each data transmitter 20*a*–20*n*** responsive to a ground signal at its Y search terminal to prevent energization of the location relay thereof. Thus the need for the above described transmitter waiting signal is eliminated.

In this alternative embodiment, means are provided at each data transmitter **20*a*–20*n* for connecting the location relay thereof in circuit with an internal source of minus 48 volts D.C. potential and to the X search terminal of the transmitter whenever the transmitter is ready to transmit. During periods of no activity, that is when no messages are being transmitted to the central receiver-recorder 22, the low resistance of the coil of the location relay of such a ready transmitter allows a substantial portion of this minus 48 volts D.C. potential to be supplied to the X search terminal of the transmitter. Means are provided in the receiver-recorder 22 responsive to this negative signal to cause a ground to be supplied on conductor 34 (FIGURE 1) to the X search terminal of the first transmitter 20*a* of the chain to energize the location relay of the ready-to-transmit transmitter, as previously described. Energization of its location relay then causes a ground to be supplied to the X terminal of the "located" transmitter. This ground is supplied, as previously described, back through the chain to the central receiver-recorder 22**.

Thus in the alternative embodiment of the invention, the series chain circuit connecting the X and Y search terminals of the chain of transmitters and the central receiver-recorder is used during the periods of inactivity to carry a negative signal to the central receiver-recorder indicating that a transmitter is ready to transmit. The central receiver-recorder then supplies a ground signal back along the chain to cause a ready-to-transmit transmitter to have its location relay energized.

This chain circuit is further used in the alternative embodiment of the invention to supply a ground to energize the location relay of each succeeding ready-to-transmit transmitter in the chain and to supply a ground to each preceding transmitter in the chain to prevent energization of any location relay thereof.

Further means are provided in each transmitter that is conditioned for operation by energization of the location relay of the transmitter. This means is responsive to a first momentary start signal from the central receiver-recorder to initiate transmission from its transmitter and is responsive to a second momentary start signal to discontinue transmission therefrom. Thus, during periods of peak activity, each start signal terminates transmission from one transmitter and initiates transmission from another. Furthermore, no hold signal from the central receiver-recorder to the transmitter is required during transmission therefrom.

SPECIFIC DESCRIPTION

In the following detailed description the circuits of the data transmitter 20 and the central receiver-recorder 22 embodying the present invention for initiating transmission from the data transmitters **20*a*–20*n*** are described with reference to FIGURES 2 and 3. FIGURES 2 and 3 may be combined in the manner shown in FIGURE 3*a* to form a complete schematic circuit diagram.

*The data transmitters*

Now referring to FIGURE 2 each data transmitter 20 comprises a plurality of data circuits T2 connected via the data channel 26 to the central receiver-recorder 22 (FIGURE 3). These data circuits T2 are under control of control circuits T4 more fully described in the above-identified copending application, Serial No. 841,926. Each data transmitter includes a transmit button T6 which is depressed by the operator when he is ready to transmit a message to the central receiver-recorder 22. When all the conditions for proper transmission have been met, as determined by the control circuits T4, the energization coil of the ready-to-transmit relay T14 is energized via conductor T22. Energization of the ready-to-transmit relay T14 causes transfer contacts T24 thereof to connect the X search terminal 30 of the transmitter shown in FIGURE 2 to one terminal of the energization coil of location relay T10.

Simultaneously, closure of contact T26 of ready-to-transmit relay T14 energizes the coil of ready-to-transmit slave relay T12. Closure of contacts T28 of relay T12 connects the second terminal of the energization coil of location relay T10 through normally closed contacts T30, T32 and T34 of transmitting relay T16, end-of-message relay T18 and transmitter waiting relay T20, respectively, to a search control conductor 42 of the common cable 24. Since the search control conductor 42 is normally supplied with minus 48 volts D.C. potential from the central receiver-recorder 22, the location relay T18 then energizes.

Upon energization of location relay T10, contacts T36 thereof close, supplying minus 48 volts D.C. via contacts T32, T30 and T28 to the energization coil of location relay T10. Thus, as long as ready-to-transmit relay T14 remains energized and transmitting relay T16 and end-of-message relay T18 remain de-energized, location relay T10 will remain energized.

Closure of contact T38 of location relay T10 supplies a ground to the energization coil of transmitter waiting relay T20 and it energizes. Energization of transmitter waiting relay T20 causes normally closed contacts T34 thereon to open so that minus 48 volts potential is now only being supplied to location relay T10 via its holding contact T36, as previously described.

Closure of contact T40 of transmitter waiting relay T20 supplies a ground to the energization coil of location relay T10 independent of transfer contact T24 of ready-to-transmit relay T14. Location relay T10 will now remain energized even through a ground is no longer supplied to X search terminal 30. Thus, after energization of transmitter waiting relay T20, even if the ready-to-transmit relay T14 of a data transmitter earlier in the chain should operate discontinuing the ground supplied to X terminal 30, location relay T10 remains energized.

Energization of transmitter waiting relay T20 also causes contacts T42 thereof to close to supply a ground via contacts T44 to end-of-message relay T18 and contacts T46 of transmitting relay T16 to a transmitter waiting conductor 44 connected to the central receiver-recorder 22 (FIGURE 3).

As described below in the specific description of the circuits of the central receiver-recorder 22, upon receipt of the transmitter waiting signal on conductor 44 the central receiver-recorder no longer supplies a ground on conductor 34 connected to the first X search terminal 30 of the first transmitter **20*a* in the chain. This insures that no transmitter earlier in the chain than the transmitter whose location relay is energized will be supplied with a ground signal to its X search terminal 30. At the same time, that is upon receipt of the transmitter waiting signal, the −48 volts signal on the search control conductor 42 of the common cable 24** is terminated, thereby insuring that no other location relay can now be energized.

Upon the initial energization of location relay T10, contacts T48 thereof close to connect the energization coil of transmitter start and hold relay T8 to transmitter start conductor 46 of the common control channels 28. As described more fully below, when there is a transmitter waiting to transmit (as indicated to the central receiver-recorder 22 by transmission of a transmitter waiting signal on a transmitter waiting conductor T44) upon the end of transmission of the message then being transmitted a short duration transmitter start signal is transmitted on transmitter start conductor 46 and along duration transmitter hold signal is transmitted on transmitter hold conductor 48. This initiates transmission from the waiting transmitter in the following manner.

The transmitter start signal (minus 48 volts D.C. potential) on conductor 46 is supplied, via contacts T48 of location relay T10, to the energization coil of transmitter start and hold relay T8. Upon energization of relay T8, contacts T50 thereof close connecting the energization coil thereof to transmitter hold conductor 48. Thus transmitter start and hold relay T8 will remain energized so long as the transmitter hold signal (also minus 48 volts D.C. potential) is received.

Energization of transmitter start and hold relay T8 causes contacts T54 thereof to close to supply a ground to energize the energization coil of transmitting relay T16. Energization of transmitting relay T16 causes contacts T56 thereof to close to supply a ground via conductor T58 to the control circuits T4 to initiate transmission of data over the data channels 26.

Energization of transmitting relay T16 further causes normally closed contacts T30 thereof to open, discontinuing the energization circuit to location relay T10. Location relay T10 then deenergizes. This opens contacts T38 thereof. However, this does not discontinue energization of transmitter waiting relay T20, since contacts T60 of transmitter start and hold relay T8 are then closed to continue supplying a ground to the energization coil of transmitter waiting relay T20.

After the control circuits T4 initiate transmission of data over data channels 26 they discontinue supplying minus 48 volts D.C. potential via conductor T22 to the energization coil of ready-to-transmit relay T14 thus de-energizing it.

Upon the initial energization of transmitting relay T16, closure of contacts T62 thereof supplies a ground to Y search conductor 32 of the transmitter 20 so that a ready-to-transmit transmitter further down the chain may have its location relays then energized.

Energization of the transmitting relay T16 transfers contacts T46 thereof to supply a ground from contact T44 of end-of-message relay T18 to a transmitter message gate conductor 50 of the common control channels 28. In a manner to be described more fully below, reception of this ground at the central receiver-recorder 22 prevents supply of a ground via conductor 34 of the common cable 24 to the X search terminal of the first transmitter in the chain.

When the transmitter has completed its transmission of data over the data channels 26, minus 48 volts D.C. potential is supplied on conductor T64 from the control circuits T4 to end-of-message relay T18 to energize it. Energization of end-of-message relay T18 opens contacts T44 thereof, discontinuing the transmitter message gate signal on conductor 50 and opens the energization circuit to location relay T10.

Thus, means are provided in the embodiment of the invention illustrated in FIGURE 2 at each data transmitter for normally connecting its X and Y search terminals together. When a transmitter is ready to transmit, its X and Y search terminals are disconnected and the location relay thereof may then be energized by simultaneous receipt of a ground at the X search terminal of the transmitter and a minus 48 volts D.C. potential signal on the search control conductor 42 to which all transmitters are connected in parallel.

If no other transmitter is waiting (i.e., has its location relay energized) a search control signal will be supplied on search control conductor 42 and ground will be supplied to the X search terminal of the transmitter either at the beginning of the transmission from a previous transmitter in the chain or at the termination of transmission from the last transmitter in the chain.

Referring again to FIGURE 1, to minimize the time between termination of transmission from the last transmitter in the chain and the initiation of transmission from the next ready-to-transmit transmitter, the Y search terminal of the last transmitter is preferably connected to the X search terminal of the first transmitter of the chain via conductor 42. Thus, the location relay of the ready-to-transmit transmitter will be energized during the transmission from the last transmitter in the chain. If conductor 42 is not provided, the location relay to the next ready-to-transmit transmitter will not be energized until termination of the transmission from the last transmitter in the chain.

Energization of the location relay conditions the transmitter for receipt of the simultaneous transmitter start-transmitter hold signal on conductors 46 and 48 and supplies a transmitter waiting signal on conductor 44 to the central receiver-recorder to indicate to it that such signals should be sent at the termination of any prior transmission in progress. Furthermore, it will be seen that means are provided to supply a ground signal to the Y search terminal of the transmitter shortly after the initiation of transmission therefrom.

Thus, during peak periods of activity each transmitter of the chain may be conditioned for start of transmission during transmission from a prior transmitter so that it may begin its transmission immediately after termination of transmission from a previous transmitter.

*The central receiver-recorder*

Now referring to FIGURE 3, the central receiver-recorder 22 of the present invention comprises: data circuits C2 for processing the data received over the data channels 26; an output recorder C4 for recording the data after processing; and, old control circuits 90, disclosed in detail in FIGURES 15A and 15B of the above-identified copending application, Serial No. 863,227. The data circuits C2 and output recorder C4 may take the forms disclosed in the above-identified applications Serial Nos. 863,227, 163,153, 196,672 and 205,659.

The relay circuitry shown to the right of the prior control circuits 90 of FIGURE 3 incorporate the teachings of the present invention into the control circuits shown in FIGURE 15C of the above-identified application Serial No. 863,227. The circuit elements of FIGURE 3 hereof whose reference characters begin with a Z are elements disclosed in the above-identified copending application Serial No. 863,227 and are identified by the same reference character. Reference should be had to that application for a disclosure of functions of the prior control circuits 90 not important to an understanding of the present invention.

During periods of inactivity, when no transmitting station **20*a*–20*n* (FIGURE 2) is transmitting or waiting to transmit to the central receiver-recorder 22, a ground is supplied to the X search terminal 30 of the first data transmitter in the chain (FIGURE 2) via conductor 34 of the common communications cable 24. This ground is supplied to conductor 34 (FIGURE 3) through the normally closed contacts C6 of transmitter waiting relay C8; through the normally closed contacts C10 of the transmitter message gate relay Z242 and through the normally open contacts C12 of the power on relay Z238**.

Power on relay Z238 is energized when the central receiver-recorder 22 is ready to receive messages by minus 48 volts D.C. potential supplied on conductor Z100 as described in the above-identified copending application Serial No. 863,227. Thus, a ground is normally supplied via conductor 34 to the X search terminal of the first transmitter of the chain (FIGURE 1).

At the same time—that is during periods of inactivity, when no messages are being transmitted and no transmitter is waiting to transmit—minus 48 volts D.C. potential is being supplied to search control conductor 42 of the common control circuits 28 so that the location relay of the ready-to-transmit transmitter may be energized. This minus 48 volts D.C. potential originates on conductor Z60 when the central receiver-recorder is ready to receive messages in a manner more fully described in the above-identified copending application Serial No. 863,227. It passes through the normally closed contacts C14 of transmitter waiting relay C8, the normally closed contacts C16 of transmitter start relay Z246 and the normally closed contacts C18 of stop preset slave relay C20.

The energization coil of stop preset slave relay C20 is connected between ground and conductor Z78. It is, therefore, energized either when the power on relay Z238 is de-energized or when the stop preset relay Z232 is energized to close its contacts Z190, as more fully described in the above-identified copending application Serial No. 863,227. It is sufficient for an understanding of the present invention to say that to stop the recording of messages by the central receiver-recorder 22, the operator depresses a stop button which energizes the stop preset relay Z232. The central receiver if it is then receiving a message will continue to receive the message and turn itself off, i.e., go into a "stop" condition at the end of that message.

Thus when the stop preset condition is reached, as indicated by energization of stop preset relay Z232, the stop preset slave relay C20 will energize opening contacts C18 thereof to terminate the minus 48 volts D.C. search control signal on search control conductor 42 so that no transmitter may have its location relay energized.

It should be noted that the stop preset relay Z232 and the circuitry of the prior control circuit 90, shown in FIGURE 3 are dotted. They appear in FIGURE 3 for the purpose of disclosing how the circuits of the present invention may be connected with the prior control circuits 90 disclosed in FIGURES 15A and 15B of the above-identified copending application Serial No. 863,227.

As described more fully above, when the location relay of the ready-to-transmit transmitter 20 has energized, a ground signal is supplied to transmitter waiting conductor 44 of the common control circuit 28. This ground is applied via transmitter waiting conductor 44 to the energization coil of transmitter waiting relay C8 of FIGURE 3. The other terminal of energization coil of transmitter waiting relay C8 is connected to the normally closed contacts Z134 of central test relay Z236 of the prior control circuits 90 via conductor C22. As described in the copending application Serial No. 863,227, conductor C22 is energized with minus 48 volts D.C. potential when the central receiver-recorder 22 is ready to receive messages. Therefore transmitter waiting relay C8 will energize upon receipt of the transmitter waiting ground signal on conductor 44.

Energization of the transmitter waiting relay C8 causes contacts C14 thereof to open discontinuing the minus 48 volts search control signal on search control conductor 42. Simultaneously upon energization of transmitter waiting relay C8, contacts C6 thereof open to discontinue the ground supplied via conductor 34 to the X search terminal 30 (FIGURE 1) of the first transmitter of the chain. Thus, during reception of a transmitter waiting signal at the central receiver-recorder 22 no other transmitter can have its location relay energized.

When the transmitter waiting relay C8 energizes, contacts C24 thereof close connecting conductor Z104 to conductors Z136 and Z138. As described in detail in the above-identified copending application Serial No. 863,277, when the central receiver-recorder is ready to receive messages conductor Z104 is supplied with minus 48 volts D.C. potential. Thus, upon closure of contacts C24 of transmitter waiting relay C8, minus 48 volts D.C. potential is supplied via conductor Z136 to start of message relay Z224 which is then energized upon receipt of an end-of-message ground signal from the data circuit C2 on conductor 250.

Energization of start of message relay Z224 upon receipt of the end-of-message signal causes contacts Z140 thereof to close, supplying via conductor 98, minus 48 volts D.C. potential to transmitter hold conductor 48 and energizing start of message slave relay Z226. Energization of start of message slave relay Z226 causes normally open contacts Z148 thereof to close completing a holding circuit to start of message relay Z224.

When contacts C24 of transmitter waiting relay C8 is closed, the minus 48 volt D.C. potential on conductor Z104 is supplied to conductor Z138, passed through normally closed contacts Z144 of start of message relay Z226 to condition transmitter start relay Z246 for energization upon receipt of the end of message signal on conductor 250. When transmitter start relay Z246 is energized, contacts Z152 thereof is closed supplying minus 48 volts D.C. potential to transmitter start conductor 46 via conductor 94.

Thus, upon receipt of an end-of-message signal on conductor 250, the transmitter start relay Z246 energizes to supply a transmitter start signal on conductor 46 of the common communications cable and start of message relay Z224 energizes to supply a transmitter hold signal on conductor 48 of the common communications cable.

Upon energization of transmitter start relay Z246, contacts Z154 thereof close, completing a holding circuit through contacts Z156 of transmitter message gate relay Z242. Thus, transmitter start relay Z246 remains energized until energization of the transmitter message gate relay Z242.

As previously described, when the ready-to-transmit transmitter (FIGURE 2) has had its transmitting relay T16 energized in response to the transmitter start and hold signals, it sends a transmitter message gate signal (a ground) on conductor 50 of the common control circuit to the central receiver-recorder. This is supplied by conductor 102 to the transmitter message gate relay Z242 which energizes, opening contact Z156 thereof, to discontinue the holding circuit to transmitter start relay Z246.

During energization of the transmitter start relay Z246 the opening of contact C16 thereof discontinues the search control signal on common control conductor 42. Energization of the transmitter message gate relay Z242 opens contact C10 thereof to prevent a ground signal being sent on conductor 34 to the X search conductor 30 (FIGURE 2) of the first transmitter in the chain.

For purposes more fully described in the copending application Serial No. 836,227, a ground message gate signal is supplied on conductor 244 upon energization of transmitter start relay Z246 by closure of contact Z158 thereof and is continued during energization of the transmitter message gate relay Z242 upon closure of contact Z157 thereof.

It will thus be seen that during the periods of inactivity the central receiver-recorder 22 of FIGURE 3 provides a minus 48 volt D.C. search control signal on search control conductor 42 and a ground on conductor 34 connected to the X search terminal 30 of the first transmitter in the chain. Upon receipt of a transmitter waiting signal on transmitter waiting conductor 44, the search control signal and the ground on conductor 34 are discontinued. The search control signal is again applied on conductor 42 after completion of transmission of a transmitter start signal and the transmitter hold signal on conductors 46 and 48, respectively. This allows the location relay of the next transmitter in the chain to energize upon receipt of a ground at the X search terminal thereof, originating at a transmitting transmitter.

The ground signal on conductor 34 is not resupplied unless no transmitter is waiting (i.e. has its location relay energized) as indicated by the absence of a transmitter waiting signal on conductor 44, and no transmitter is transmitting as indicated by the absence of a transmitter message gate signal on conductor 50.

*Alternative system*

An alternative embodiment of the invention, utilizing a minimum number of wires for interconnecting the data transmitters 20*a*–20*n* and central receiver-recorder 22, is shown in FIGURE 4. In the system illustrated in FIGURE 4, the data transmitters 20*a* to 20*n* are connected in a chain circuit, as shown in FIGURE 1. However, the Y search terminal 32 of the last transmitter 20*n* of the chain is not connected to the X search terminal 30 of the first transmitter 20*a* as shown in FIGURE 1, for reasons that will become apparent from the description below.

Again referring to FIGURE 4, the X search terminal 30 of the first transmitter 20*a* of the chain is connected via wire 60 to the central receiver-recorder 22. Transmitter start conductor 46 is connected in parallel from the central receiver-recorder 22 to each of the data transmitters 20*a* to 20*n* and all of the data transmitters are connected in parallel via data channels 26 to the central receiver-recorder. No other connections are required between the data transmitters 20*a* through 20*n* and the central receiver-recorder 22 for initiating transmission of data over the data channels 26. Yet as in the embodiment of the invention, shown in FIGURES 2 and 3, the conditioning of each transmitter for transmission takes place during transmission from another transmitter, other control functions may be provided, if desired, for the purposes of minimizing errors, conserving system time, and the like.

Still referring to FIGURE 4, each data transmitter 20 is provided with data circuits T2, control circuits T4 and a transmit button T6 connected and operating in the manner described with reference to the embodiment of the invention shown in FIGURE 2.

When a transmitter is ready to transmit, its ready to transmit relay T14 is energized via conductor T22 from control circuits T4. Energization of the ready-to-transmit relay T14 transfers contacts T24 thereof to connect one side of the energization coil of location relay T10 to the X search terminal 30 of the transmitter, in the manner previously described.

However, during periods of inactivity, the central receiver-recorder 22 does not continuously provide a ground signal to the first X search terminal 30 of the first data transmitter 20_a_ of the chain (FIGURE 1), as is the case in the embodiment described with reference to FIGURES 2 and 3. Rather, means are provided at the central receiver-recorder 22 for recognizing that a location relay T10 has been connected in the chain circuit and for thereupon supplying a ground on conductor 60 to the first X search terminal 30 of the first transmitter 20_a_ in the chain. This is accomplished in the following manner.

When contacts T24 of ready-to-transmit relay T14 transfer, thereby connecting one side of the energization coil of location relay T10 to the X search terminal 30, the other side of the energization coil of relay T10 is connected to a source of minus 48 volts D.C. potential via contacts T70 of end-of-message relay T18 and contacts T72 of feedback relay T74. Both of these relays are at this time de-energized. The energization coil of location relay T10 is chosen to have low resistance so that this minus 48 volts D.C. potential will appear at the X search terminal 30 of the transmitter whose ready-to-transmit relay T14 has operated. This "ready-to-transmit" signal will be passed back through the chain and via conductor 60 to the grid C30 of a triode C32 at the central receiver-recorder 22.

Triode C32 is normally in the conducting state, but when this negative signal is applied to its grid C30 it becomes cut off. Triode C32 is connected in circuit, as shown in FIGURE 4, with triode C34. Normally, when triode C32 is conducting, triode C34 is cut off, and a start chain relay C36, connected in circuit with the plate C38 of triode C34, is deenergized. However, upon receipt of the minus 48 volts D.C. ready-to-transmit signal on conductor 60, triode C32 cuts off, and triode C34 is allowed to conduct, energizing start chain relay C36.

Energization of start chain relay C36 closes contacts C38 thereof, to supply a ground to conductor 60 connected to the first X search terminal 30 of the first transmitter 20_a_ of the chain. This ground proceeds down the chain to the X search terminal 30 of the transmitter whose ready-to-transmit relay T14 has energized and then energizes the location relay T10 thereof.

Upon energization of location relay T10, contacts T76 thereof close, to supply a holding circuit ground to the energization coil of location relay T10, so that it remains energized independently of the existence of a ground at the X search terminal 30.

Meanwhile, at the central receiver-recorder 22, the ground supplied to conductor 60, upon closure of contacts C40 of start chain relay C36, causes triode C32 to conduct and to thereupon cut off triode C34 and deenergize start chain relay C36.

However, during the momentary energization of start chain relay C36, contacts C42 thereof close to supply minus 48 volts D.C. potential to transmitter start conductor 46. This start signal is supplied through a diode T78 and contacts T48 of energized location relay T10 to momentarily energize transmitter start and hold relay T8. The momentary energization of transmitter start and hold relay T8 causes closure of contacts T80 thereof to complete a holding circuit through contacts T80 and contacts T82 of a transmitter stop relay T84, which is deenergized at this time. Thus, transmitter start and hold relay T8 remains energized until the energization of transmitter stop relay T84.

Upon energization of transmitter start and hold relay T8, contacts T54 thereof close to energize transmitting relay T16. Closure of contacts T56 of transmitting relay T16 supplies a ground signal via conductor T58 to the control circuits T4 to initiate transmission in the manner previously described.

Closure of contacts T62 of transmitting relay T16 supplies a ground to Y search terminal 32 to energize the location relay T10 of the next ready-to-transmit transmitter in the chain. This ground is also supplied through contacts T88 of ready-to-transmit relay T14 to energize feedback relay T74. Energization of feedback relay T74 opens contacts T72 thereof to discontinue the energization circuit of location relay T10. This condition prevails until ready-to-transmit relay T14 is deenergized during the transmission. Then feedback relay T74 deenergizes.

Shortly after the end of transmission of the message, in a manner to be described below, the central receiver-recorder 22 generates a second transmitter start signal on transmitter start conductor 46 which initiates transmission from the next transmitter of the chain whose location relay T10 has energized. This second transmitter start signal on conductor 46 is now supplied through the now closed contacts T86 of transmitting relay T16 to transmitter stop relay T84 which energizes. Energization of transmitter stop relay T84 opens contacts T82 thereof to discontinue the holding circuit to transmitter start and hold relay T8 which then deenergizes. Diode T78 prevents the minus 48 volts D.C. supplied through contacts T82 and T80 from being seen on the transmitter start conductor 46.

When an error is detected at the central receiver-recorder 22, the second transmitter start signal on conductor 46 will be immediately transmitted. It will start the next transmission from the next ready transmitter and will energize transmitter stop relay T84 to discontinue transmission from the transmitting transmitter.

Transmitters farther down the chain from an energized ready-to-transmit relay T14 cannot have their location relays T10 energized, since no ground will be supplied down the chain due to the transfer of contacts T24. Transmitters earlier in the chain may not have their location relays T10 energized after the location relay T10 in question has energized, since contacts T76 thereof will supply a ground via contact T24 to the X search terminal 30 of the transmitter in question. This will appear at the Y search terminal of the preceding ready transmitter of the chain and its contacts T88 will connect its feedback relay T74 in circuit, and open contacts T72 thereof, thus preventing energization of location relay T10. Closure of contacts T90 of feedback relay T74 supplies this feedback ground to the X search terminal of the transmitter so that the feedback ground passes back through the chain, to inhibit energization of the location relays T10 closer to the central receiver-recorder 22.

At the beginning of transmission from any transmitter upon operation of transmitting relay T16 thereof, contacts T62 close to supply a ground to Y search terminal 32 and energize the location relay of the next ready-to-transmit transmitter of the chain. Additionally, this ground energizes feedback relay T74, opening contacts T72 thereof, to de-energize location relay T10. Closure of contacts T90 of feedback relay T74 supplies a ground to the X search terminal of the transmitting transmitter to prevent energization of the location relay of any prior transmitter in the chain until ready-to-transmit relay T14 has de-energized, whereupon a ground will be supplied to the X terminal via closes contacts T62 of transmitting relay T16. To this end feedback relay T74 is chosen to have a slow enough release time so that contacts T90 thereof do not open until contacts T24 of ready-to-transmit relay T24 have transferred to their de-energized position shown in FIGURE 4.

Furthermore, the energization times of location relay T10 and feedback relay T74 are chosen so that if a ground is present at Y search terminal 32, upon energization of ready-to-transmit relay T14, the circuit to the energization coil of location relay T10 will be discontinued by opening of normally closed contacts T72 of feedback relay T74 before contacts T76 of location relay T10 close.

Still referring to FIGURE 3, triode C32 may be one half of a type 5963 and triode C34 may be one half of a type 5687. Grid C30 is connected to ground through grid resistor C44, a 470 kilohm ½-watt resistor. The cathode C46 of triode C32 is connected to ground.

The plate C48 of triode C32 is connected through a 100 kilohm, 1-watt resistor C50 to a source of plus 250 volts D.C. potential and through a 470 kilohm, ½-watt resistor C52 to the grid C54 of triode C34. The grid C54 of triode C34 is also connected to a source of minus 150 volts D.C. potential through a 750 kilohm, ½-watt resistor C56. The cathode C58 of triode C34 is connected to ground. The plate C38, as previously described, is connected through the energization coil of start chain relay T36 to a source of plus 250 volts D.C. potential.

The transmitter start signal on conductor 46, upon the occurrence of the end of a message transmission, or an error, is generated in the following manner. An end-of-message or error relay C58 is provided at the central receiver-recorder 22. The energization coil thereof is connected to a source of plus 250 volts D.C. potential and to a conductor C60, upon which a ground signal occurs whenever a message ends or there is an error. This signal is generated by data recording and control circuits C62 of the form disclosed in the above-identified copending application, Serial Number 863,227. Thus, conductor C60 may be connected, as shown by dotted lines, in circuit with relay X72 of FIGURE 13 of the above-identified copending application, Serial Number 863,227.

Upon the occurrence of the end of a message or an error, contacts C62 of end-of-message or error relay C58 close to supply minus 48 volts D.C. potential to transmitter start conductor 46.

Start chain relay C36 is chosen to have an energization time greater than that of the feedback relays T74. This is because upon energization of a ready-to-transmit relay T14, of a transmitter closer in the chain to the central receiver-recorder 22 than any transmitter whose ready-to-transmit relay T14 has already energized, will momentarily cause the minus 48 volts D.C. potential ready-to-transmit signal to be supplied back along the chain to triode C32 to momentarily supply energization to the coil of start relay chain C36. However, this will be discontinued upon energization of feedback relay T74. Since energization of relay T74 is chosen to occur prior to closure of contacts C42 of start chain relay C36, the transmitter whose ready-to-transmit relay T14 operated, will not have the location relay T10 thereof energized.

Thus, means are provided in each data transmitter 20*a*–20*n* of the alternative embodiment of the invention, as shown in FIGURE 4, to disconnect the X search terminal from the Y search terminal of a ready-to-transmit transmitter; means are thereby conditioned to be responsive to a ground signal on the X search terminal thereof to thereby condition means responsive to a transmitter start signal on conductor 46. Means are provided responsive to a ground signal at the X search terminal to produce a ground signal at the X search terminal until termination of transmission from the transmitter. Means are provided in each transmitter responsive to a ground signal on the Y search terminal thereof to inhibit response of a transmitter to a ground signal on the X search terminal thereof and to provide a ground signal at the X search terminal thereof even when said terminals are disconnected.

Means are provided at the central receiver-recorder, of the alternative embodiment of the invention shown in FIGURE 4, responsive to a long duration negative ready-to-transmit signal at the X search terminal of the first transmitter of the chain to supply a ground signal thereto to initiate operation of the chain circuit.

Cooperating means are provided at each data transmitter for producing this negative ready-to-transmit signal at the X terminal thereof when the transmitter is ready to transmit. Further means are provided at each transmitter for discontinuing said ready-to-transmit signal upon receipt of a ground signal at the Y search terminal thereof.

Means are also provided in the embodiment of the invention shown in FIGURE 4, at each transmitter responsive to a first transmitter start signal, when the transmitter is conditioned for transmission, to initiate transmission therefrom, and responsive to a second transmitter start signal to discontinue transmission therefrom. Cooperating means are provided in the central receiver-recorder for generating a transmitter start signal at the end of any message or upon the occurrence of an error in a message, or whenever, after periods of inactivity, a negative signal occurs at the X search terminal of the first transmitter in the chain.

It will be understood by those skilled in the art that, while the means shown in FIGURE 4 include primarily electromechanical relays, other electronic relays may be substituted therefor, or the functions thereof may be provided through the use of other electrical devices, such as uni-directional conducting devices and electron switching devices, for example electron tubes and transistors. Thus, any means providing the required signals at the proper times are within the purview of the invention.

SUMMARY OF THE INVENTION

The invention therefor comprises a plurality of data transmitters with X and Y terminals connected in a series chain circuit with the X search terminal of the first transmitter of the chain connected to the central receiver-recorder of the system. The X and Y terminals of each transmitter are normally connected together internally.

Whenever a transmitter is ready-to-transmit the terminals are disconnected and the transmitter is conditioned for response to a transmission conditioning signal on the X search terminal thereof. After initiation of transmission from any transmitter, it supplies to the Y terminal thereof said transmission conditioning signal to condition the next ready-to-transmit transmitter for transmission.

Transmitters further down the chain from a transmitter whose search terminals have been disconnected (indicating that it is ready to transmit) may not be conditioned for transmission until after the ready-to-transmit transmitter begins its transmission, because only then will it supply the transmission conditioning signal to its Y search terminal.

Earlier transmitters in the chain are prevented from being conditioned for transmission in one embodiment of the invention by each transmitter supplying the central receiver-recorder with a waiting signal whenever it is in condition for transmission and by the central receiver-recorder supplying a control signal to all of the transmitters during this period which inhibits the conditioning of any transmitter for transmission.

In another embodiment of the invention, earlier transmitters in the chain are inhibited by the internal supply of a transmission conditioning inhibit signal to the X search terminal of a transmitter conditioned for transmission. This signal passes back through the chain. Means are provided in each transmitter responsive to this inhibit signal on the Y search terminal thereof to inhibit the conditioning for transmission thereof in response to a conditioning signal on the X search terminal thereof and for supplying the inhibit signal to the X search terminal thereof.

In one embodiment of the invention the central receiver-recorder provides a conditioning signal to the X search terminal of the first transmitter in the chain whenever the central receiver-recorder is not receiving messages and not receiving said waiting signal.

In another embodiment of the invention, operation of the chain is initiated after such periods of inactivity by each ready transmitter supplying a ready-to-transmit signal to the X terminal thereof. This ready-to-transmit signal is passed back along the chain to the central receiver-recorder. Means are provided in central receiver-recorder responsive to this ready-to-transmit signal to supply said conditioning signal to the X search terminal of the first transmitter of the chain.

The invention further provides in an alternative embodiment, means at each transmitter, which, after a transmitter has been conditioned for transmission, is responsive to a first start signal from said central receiver-recorder to initiate transmission therefrom and to a second identical start signal from said central receiver-recorder to terminate transmission therefrom. Thus, during periods of peak activity, transmission from a transmitting transmitter may be terminated and transmission from a transmitter conditioned for transmission may be initiated by the same signal simultaneously.

It will thus be seen that the objects set forth above, among those made apparent from the preceding description, are efficiently attained and, since certain changes may be made in practicing the disclosed method of data collection and in the apparatus set forth without departing from the scope of the invention, it is intended that all matter contained in the above description or shown in the accompanying drawings shall be interpreted as illustrative and not in a limiting sense. It is to be understood, for example, that while the preferred embodiment discloses multiconductor communication and control cables as the intercommunicating links between transmitter or reader stations and the central receiver-recorder, the invention is not so limited but may be employed with other suitable types of communication channels such as, but not limited to, multiple frequency carrier circuits over a common conductor, or radio frequency communication channels which may be either amplitude or frequency modulated. It is further to be understood that while the continuous medium record output disclosed herein is punched tape, the invention is equally applicable to magnetic tape, or to any other form of record media. Wherever thermionic and electromechanical switching devices have been disclosed herein it will be understood that equivalent electronic devices, including solid state devices such as transistors, may be substituted without departing from the invention.

It is also to be understood that the following claims are intended to cover all of the generic and specific features of the invention which, as a matter of language, might be said to fall therebetween, and to cover any system or apparatus employing means providing the claimed signals for similar purposes.

Particularly, it is to be understood that in said claims, elements or signals recited in the singular are intended to include compatible combinations of equivalent elements or signals wherever the sense permits.

What is claimed is:

1. A data collection system comprising, in combination:

(A) a plurality of data transmitters, a central receiver, and common communications channels connecting said data transmitters to said central receiver;

(B) each of said data transmitters having first and second control terminals;

(C) a chain circuit in said common communications channel connecting said first and second control terminals of said data transmitters in a series circuit;

(D) ready-to-transmit condition responsive means at each data transmitter to disconnect the said first and second control terminals thereat;

(E) transmission conditioning means at each data transmitter conditioned for operation by said ready-to-transmit condition responsive means, and during a ready-to-transmit condition at the data transmitter responsive to a first signal at said first control terminal;

(F) transmission initiating means at each data transmitter responsive to a start signal from said central receiver-recorder to initiate transmission from the data transmitter;

(G) means at each data transmitter for supplying said first signal to the second control terminal of the data transmitter during transmission of data therefrom;

(H) transmission terminating means at each data transmitter conditioned for operation by said transmission initiating means upon receipt of said start signal from said central receiver-recorder to terminate transmission from the data transmitter;

(I) chain starting means for supplying to said first control terminal of the first said data transmitter said first signal when no data transmitter is transmitting and no transmission conditioning means has operated in response to said first signal; and (J) means at said central receiver-recorder responsive to the termination of transmission of the occurrence of an error during transmission of data from said data transmitters to provide to all of said transmitters said transmitter start signal.

2. The combination defined in claim 1; wherein said chain starting means comprises:

(a) means at each of said data transmitters for transmitting to said data receiver a transmitter waiting signal when the transmission conditioning means thereof has operated in response to said first signal, (b) inhibiting means at each of said data transmitters responsive to a control signal from said data receiver for preventing operation of said transmission conditioning means in response to said first signal, and (c) means at said data receiver for supplying to all of said data transmitters said control signal only when said transmitter waiting signal is not being received thereat.

3. A data collection system comprising, in combination:

(A) a plurality of data transmitters, a data receiver, and common communications channels connecting said data transmitters to said data receiver;

(B) a chain circuit connecting all of said data transmitters in series;

(C) means at said data transmitters for conditioning ready-to-transmit data transmitters for transmission of data to said data receiver comprising, (a) means at each of said data transmitters for transmitting during each transmission therefrom a transmission conditioning signal in one direction on said chain circuit, and (b) means at each of said data transmitters responsive to said transmission conditioning signal and to a ready-to-transmit condition thereat to condition the transmitter for transmission;

(D) means at said data receiver for generating a start-stop signal;

(E) means at each of said data transmitters responsive to said start-stop signal when conditioned for transmission to transmit data over said common communications channels to said data receiver; and (F) means at said data receiver for providing said transmission conditioning signal to said chain circuit during periods when no messages are being transmitted from said data transmitters;

(G) transmission terminating means at each of said data transmitters responsive to receipt thereat of said start-stop signal during a transmission therefrom to terminate the transmission in progress;

(H) means at each of said data transmitters for transmitting a busy signal to said data receiver when the data transmitter is transmitting data to said data receiver; and, (I) means at said data receiver responsive to said busy signal to prevent transmission of said transmission conditioning signal during receipt of said busy signal.

4. The data collection system defined in claim 3; wherein said data receiver is connected to said chain circuit and said means at said data recorder for providing said transmission conditioning signal to said chain circuit does so in response to a ready-to-transmit signal on said chain circuit; and said data collection system further comprises:

(J) ready-to-transmit signalling means at each of said data transmitters for transmitting in a second direction on said chain circuit a ready-to-transmit signal in response to a ready-to-transmit condition thereat; and, (K) means at each of said data transmitters responsive to said ready-to-transmit signal on said chain circuit to inhibit the response of said transmission conditioning means to said transmission conditioning signal on said chain circuit.

References Cited by the Examiner

UNITED STATES PATENTS

| | | | |
|---|---|---|---|
| 3,063,036 | 11/1962 | Reach et al. | 340—172.5 |
| 3,099,818 | 7/1963 | Murray | 340—172.5 |

ROBERT C. BAILEY, *Primary Examiner.*

M. LISS, P. J. HENON, *Assistant Examiners.*